US008548460B2

(12) United States Patent
Wang et al.

(10) Patent No.: US 8,548,460 B2
(45) Date of Patent: Oct. 1, 2013

(54) CODEC DEPLOYMENT USING IN-BAND SIGNALS

(75) Inventors: Min Wang, San Diego, CA (US); Dai Yang, San Diego, CA (US); Vivek Rajendran, San Diego, CA (US); Ananthapadmanabhan Arasanipalai Kandhadai, San Diego, CA (US); Alireza R. Heidari, Encinitas, CA (US); Jeremy P. Toman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 12/904,900

(22) Filed: Oct. 14, 2010

(65) Prior Publication Data

US 2011/0294501 A1 Dec. 1, 2011

Related U.S. Application Data

(60) Provisional application No. 61/373,243, filed on Aug. 12, 2010, provisional application No. 61/348,203, filed on May 25, 2010.

(51) Int. Cl.
*H04W 4/00* (2009.01)
*H04B 1/38* (2006.01)
*H04M 3/42* (2006.01)

(52) U.S. Cl.
USPC ...... 455/426.1; 455/560; 455/445; 455/414.1

(58) Field of Classification Search
USPC ........... 455/426.1, 560, 445, 414.1; 370/467, 370/352
See application file for complete search history.

(56) References Cited

U.S. PATENT DOCUMENTS

| 6,091,969 | A * | 7/2000 | Brophy et al. | 455/560 |
| 6,353,666 | B1 * | 3/2002 | Henderson et al. | 379/229 |
| 7,307,980 | B1 * | 12/2007 | Shah | 370/352 |

(Continued)

FOREIGN PATENT DOCUMENTS

| EP | 1406461 A1 | 4/2004 |
| EP | 1646251 | 4/2006 |

(Continued)

OTHER PUBLICATIONS

3rd Generation Partnership Project 2, 3GPP2: "CDMA Tandem Free Operation", 3GPP2—Drafts, 2500 Wilson Boulevard, Suite 300, Arlington, Virginia 22201 USA, May 13, 2002, XP040360914.

(Continued)

*Primary Examiner* — Meless N Zewdu
*Assistant Examiner* — Jean Chang
(74) *Attorney, Agent, or Firm* — Heejong Yoo

(57) ABSTRACT

After a call is established between two stations using a codec that has been negotiated during call setup, in-band signaling may be used between the two stations to change the codec that is to be used. The in-band signals are indicative that the station that is transmitting the in-band signals can operate with a second codec and are used to probe whether the receiving station can also operate with that second codec. If the receiving station detects and reacts to the in-band signals, then both stations change to communicate with the second codec. The second codec has compatible packet sizes of the deployed (originally negotiated) codec without any need of infrastructure upgrade and/or quality compromise to legacy phone users (i.e., stations that cannot operate with the second codec).

48 Claims, 11 Drawing Sheets

(56) References Cited

U.S. PATENT DOCUMENTS

| | | |
|---|---|---|
| 7,844,292 B2 | 11/2010 | Shamburger |
| 2003/0031200 A1 | 2/2003 | Lehtimaki |
| 2003/0063569 A1 | 4/2003 | Kalliokulju et al. |
| 2003/0210659 A1 | 11/2003 | Chu et al. |
| 2004/0037314 A1 | 2/2004 | Spear |
| 2004/0254796 A1* | 12/2004 | Lehtimaki .................... 704/500 |
| 2005/0143984 A1 | 6/2005 | Makinen et al. |
| 2005/0232232 A1* | 10/2005 | Farber et al. ................. 370/352 |
| 2006/0026293 A1 | 2/2006 | Virdi et al. |
| 2007/0041320 A1 | 2/2007 | Chen et al. |
| 2011/0044163 A1 | 2/2011 | Nishioka |
| 2011/0317681 A1 | 12/2011 | Nishioka |
| 2013/0035105 A1 | 2/2013 | Yu et al. |

FOREIGN PATENT DOCUMENTS

| | | |
|---|---|---|
| WO | WO03092312 A1 | 11/2003 |
| WO | WO2006063622 A1 | 6/2006 |
| WO | WO2008086823 A1 | 7/2008 |
| WO | 2011150104 A1 | 12/2011 |

OTHER PUBLICATIONS

International Search Report and Written Opinion—PCT/US2011/037968, International Search Authority—European Patent Office—Aug. 31, 2011.

"Digital cellular telecommunications system (Phase 2+); Tandem Free Operation (TFO); Service Description; Stage 2 (GSM 03.53 version 8.0.0 Release 1999)", Mar. 1, 2000, XP050357983.

* cited by examiner

CODEC DEPLOYMENT USING IN-BAND SIGNALS

CROSS-REFERENCE TO RELATED APPLICATIONS

This application claims priority under the benefit of 35 U.S.C. §120 to Provisional Patent Application No. 61/348,203, filed on May 25, 2010, and Provisional Patent Application No. 61/373,243, filed on Aug. 12, 2010. These provisional patent applications are hereby expressly incorporated by reference herein in their entirety.

BACKGROUND

In telecommunications networks, information is transferred in an encoded form between a transmitting communication device and a receiving communication device, such as an originating station and a terminating station. The transmitting communication device encodes original information, such as voice signals, into encoded information and sends it to the receiving communication device. The receiving communication device decodes the received encoded information to recreate the original information. The encoding and decoding is performed using codecs. The encoding of voice signals is performed in a codec located in the transmitting communication device, and the decoding is performed in a codec located in the receiving communication device.

There are many different speech codecs. With some codecs, transcoding may be required when the source and destination devices use incompatible codecs. Transcoding is a process by which a voice signal encoded according to one rate and encoding standard is converted to another encoding standard and possibly another rate. Transcoding can introduce latency and degradation in the voice signal being transmitted. To avoid the difficulties associated with transcoding, transcoder-free operation (TrFO) has been developed. With transcoder-free operation, a connection is established between telecommunications endpoints, such as mobile telephones and/or non-mobile telephones, that have compatible codecs so the connection does not use transcoders. TrFO has been widely deployed to eliminate the quality degradation due to network transcoding. Transcoding is not limited to the case when the source and the destination device use incompatible codecs. Additionally, tandem free operation (TFO) is a technique that may be used to deliver encoded information from one device to another device faithfully when the core network is circuit-switched.

Some telecommunications endpoints allow users to make calls over the Internet. Voice over Internet Protocol (VoIP) uses communication protocols and transmission technologies for delivery of voice communications and multimedia sessions over Internet Protocol (IP) networks, such as the Internet. VoIP systems use session control protocols to control the set up and ending of calls, and use audio codecs which encode speech allowing transmission over an IP network as digital audio via an audio stream. Codec use is varied between different implementations of VoIP. Often a range of codecs are used. Some implementations use narrowband and compressed speech, while others support high fidelity stereo codecs. VoIP systems do not use TFO or TrFO and may not perform transcoding.

Some codecs may not be implemented, however, because of infrastructure upgrade cost to operators and service providers as well as the core architectural complexity and availability of appropriate handsets. For example, Enhanced Variable Rate Wideband Codec (also referred to as EVRC-WB), developed with the latest speech compress technology, is able to carry speech characteristics from 50 Hz to 7 kHz and therefore provides clearer and more natural sounds than any of its predecessors in the EVRC (Enhanced Variable Rate Codec) family of codecs, like EVRC and EVRC-B which convey speech contents from 300 Hz to 4 kHz, that have been operated in cdma2000 networks. However, cdma2000 operators have not introduced it due to a lack of understanding of the infrastructure upgrade cost and the hardware modifications that would be required for handsets.

SUMMARY

After a call is established between two stations (such as two mobile devices, two non-mobile devices, or one mobile device and one non-mobile device) using a codec that has been negotiated during call setup, in-band signaling may be used between the two stations to change the codec that is resident in the mobile device or the end terminal to be used. The in-band signals are indicative that the station that is transmitting the in-band signals can operate with a second codec and are used to probe whether the receiving station can also operate with that second codec. If the receiving station detects and reacts to the in-band signals, then both stations change to communicate with the second codec. The second codec has compatible packet sizes of the deployed (originally negotiated) codec without any need of infrastructure upgrade and/or quality compromise to legacy phone users (i.e., stations that cannot operate with the second codec).

In an implementation, the call is established with a first codec (e.g., EVRC-B, narrowband), and in-band signals are sent from the terminating station to the originating station. The in-band signals are indicative that the terminating station can operate with a second codec (e.g., EVRC-WB, wideband) and are used to probe whether the originating station can also operate with the second codec. In some implementations, either station or both stations can send the in-band signals after the call is established.

In an implementation, the in-band signals are designed such that (a) they are not received as a valid packet by a legacy decoder (e.g., a decoder that only operates in the first codec mode, or a decoder that does not operate in the codec mode indicated by the in-band signals transmitted by the terminating station), and (b) if they reach the receiver of a station that can operate in the second codec mode, the station can reliably conclude that the transmission path is transcoding free and the station on the other side is also operable in the second codec mode so that it may switch to use the second codec.

In an implementation, the in-band signals are transmitted periodically for a limited time frame to minimize the quality impact to legacy phone users.

In an implementation, during the communication between the stations using the second codec, it may be determined if an event occurs that indicates that the first codec (the originally negotiated codec) should be used instead of the second codec. Such an event may be a transcoding event, a service option change, a three-way call, a conference call, or a handoff to a non-TrFO and/or non-TFO network. If such an event occurs, then the stations switch back to using the originally negotiated codec. In-band signals may also be used in a process of switching from the second codec to the first codec or a newly negotiated codec. For example, in an implementation, a call may be established between two stations, and the two stations may negotiate a first codec to use, such as EVRC-B. At some point, the two stations switch to using a second codec, such as EVRC-WB. During the call, it is determined to include a third station on the call (e.g., make the call a three-way call with a third station). To include the third station, the two stations fallback to using the first codec. At some point, the three-way call is terminated (the third station terminates being on the call), and the two stations switch back to using the second codec.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
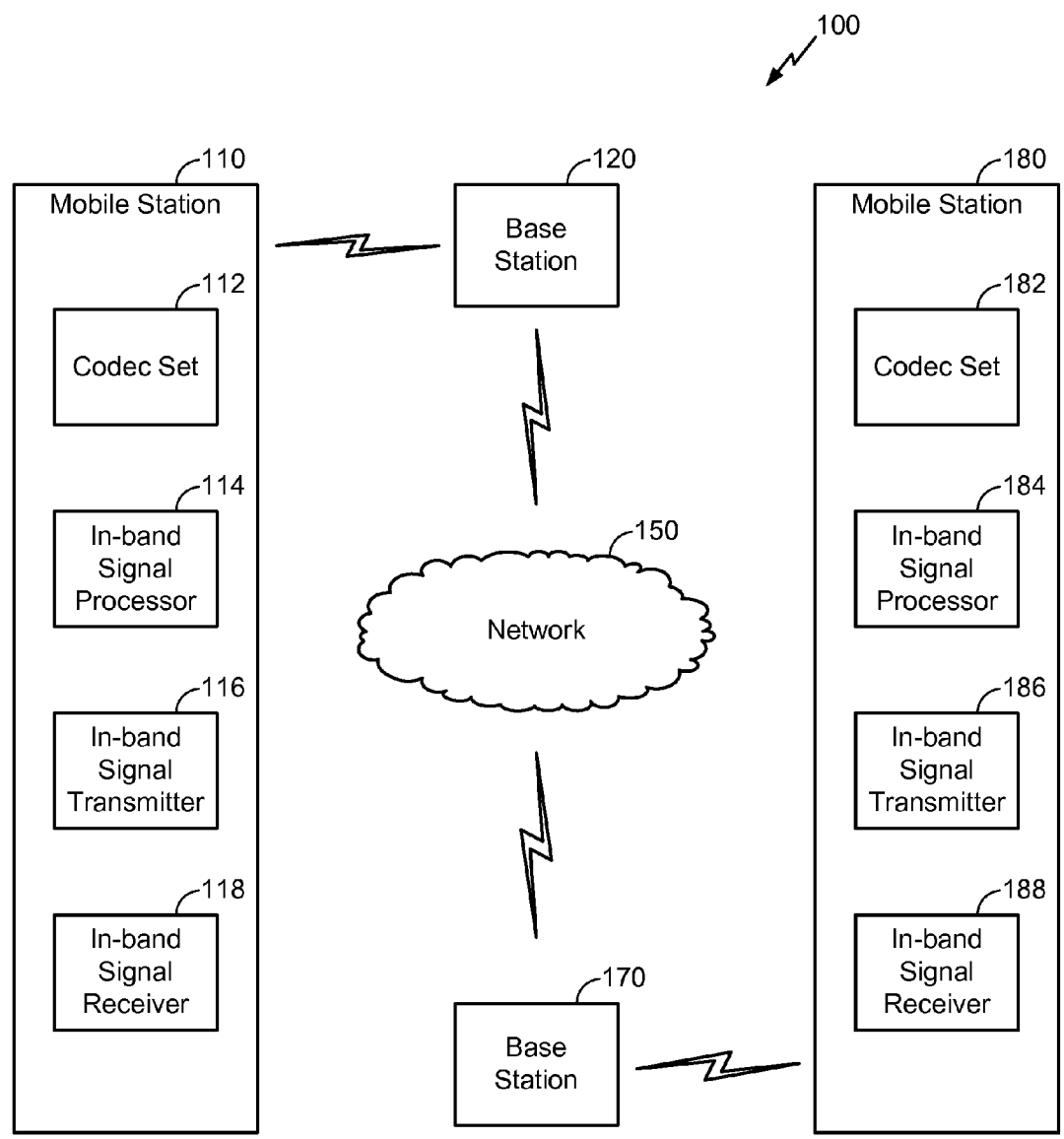
FIG. 1 is an illustration of an example environment for providing codec deployment using in-band signals.

FIG. 1 is an illustration of an example environment 100 for providing codec deployment using in-band signals. The environment 100 can use, without limitation, code division multiple access (CDMA) principles, Global System for Mobile Communications (GSM) principles, or other wireless principles including wideband CDMA (WCDMA), cdma2000 (such as cdma2000 1x or 3x air interface standards, for example), time division multiple access (TDMA), and frequency division multiple access (FDMA), for example. Multimedia content, including speech, can alternatively be provided, for example, over a bidirectional point-to-point link if desired, such as, e.g., a Bluetooth link or a 802.11 link or a CDMA link or GSM link. Likewise, speech content may also be transmitted using a Voice over Internet Protocol (VoIP). VoIP is a protocol optimized for the transmission of voice through the Internet or other packet switched networks, which may interface with and/or merge with CDMA and GSM based systems.

Within the environment 100, a call is established between a mobile station 110 and a mobile station 180 via base stations 120, 170, and a network 150. The base station 120 may establish a communication link with the mobile station 110 over the air interface. Various over the air interfaces developed for wireless communication systems include FDMA, TDMA, and CDMA. In connection therewith, various domestic and international standards have been established including, e.g., Advanced Mobile Phone Service (AMPS), GSM, and Interim Standard 95 (IS-95). Implementations described herein reside in a wireless telephony communication system configured to employ a CDMA over the air interface. Nevertheless, it would be understood by those skilled in the art that methods and apparatuses having features as described herein may reside in any of the various communication systems employing a wide range of technologies known to those of skill in the art, such as systems employing VoIP over wired and/or wireless (e.g., CDMA, TDMA, FDMA, etc.) transmission channels.

The base station 120 may establish a communication link with the base station 170 through the network 150, and the base station 170 may establish a communication link with the mobile station 180 over the air interface. The communication links may be CDMA communication links, but the application is not limited thereto, as any wireless or wireline type communication links may be used depending on the implementation and without departing from the spirit of the invention.

In an implementation, the environment 100 may comprise a wireless communication network. The wireless communication network may be a CDMA system, a GSM system, etc. Wireless communication networks are widely deployed to provide various communication services such as voice, video, packet data, messaging, broadcast, etc. These wireless communication networks may include packet switched networks and circuit switched networks. Packet switched refers to transfer of data for a user via common resources (e.g., a shared channel) that may be shared by multiple users. Circuit switched refers to transfer of data for a user via dedicated resources (e.g., a dedicated channel) assigned to the user. Any network may be used within the environment 100, such as those capable of transcoder free operation (TrFO) or tandem free operation (TFO). Example networks include a cdma2000 1x circuit switched network and a cdma2000 1x packet switched network, implementations of which are described with respect to FIGS. 2 and 3, respectively, for example.

In an implementation, the network 150 (i.e., the core network), comprises a wired connection (e.g., a T1 or E1 type backhaul). A core network is the well known central part of a telecommunications network that provides various services to customers who are connected to it, e.g. by an access network. In some implementations, the core network (e.g., the network 150) may be wireless. Depending on the implementation, the connection between the base station(s) 120, 170 and the core network may be wired or wireless.

The techniques described herein may be used for the networks and technologies mentioned above as well as other networks and radio technologies. For clarity, certain aspects of the techniques are described below for 3GPP2 networks, and 3GPP2 terminology is used in much of the description below. In 3GPP2, IS-2000 Releases 0 and A are commonly referred to as cdma2000 1X, and IS-2000 Release C is commonly referred to as cdma2000 1xEV-DV. IS-2000 networks are circuit switched networks and are commonly referred to as 1X networks. IS-856 is commonly referred to as High Rate Packet Data (HRPD), cdma2000 1xEV-DO, 1xEV-DO, 1x-DO, DO, High Data Rate (HDR), etc. IS-856 networks are packet switched networks and are commonly referred to as HRPD networks.

Each mobile station 110, 180 may be a wireless communication device such as a cellular phone, a terminal, a handset, a personal digital assistant (PDA), a wireless modem, a cordless phone, a handheld device, a laptop computer, etc. An example mobile station is described with respect to FIG. 11.

The mobile station 110 has a codec set 112 and the mobile station 180 has a codec set 182. Each codec set 112, 182 has a number of codecs that can be selectively enabled for processing audio data. The codec set 112 may be the same or different as the codec set 182. For example, the codec set 112 may have the same number of codecs and the same capabilities as the codec set 182. As another example, the codec set 112 may have a different number of codecs and/or different capabilities as the codec set 182. Examples of codecs that can be included in the codec sets 112, 182 include EVRC-WB and EVRC-B, although any number and types of codecs can be used without departing from the spirit of the invention.

The mobile station 110 may also comprise an in-band signal processor 114, an in-band signal transmitter 116, and an in-band signal receiver 118. The in-band signal processor 114 may generate in-band signals for transmission from the in-band signal transmitter 116 to the mobile station 180, and may process in-band signals received via the in-band signal receiver 118 from the mobile station 180. Similarly, the mobile station 180 may comprise an in-band signal processor 184 to generate in-band signals for transmission from an in-band signal transmitter 186 to the mobile station 110, and to process in-band signals received via the in-band signal receiver 188 from the mobile station 110. In telecommunications, in-band signaling is the sending of metadata and control information in the same band, on the same channel, as used for data; that is, utilizing the connection reserved for user data transmission.

Call setup is the process of establishing dedicated physical channels and negotiating service configuration parameters between a mobile station and a base station so that communication can take place. After a call is established between the two mobile stations 110 and 180 using a codec that has been negotiated during call setup, in-band signaling may be used between the two mobile stations 110, 180 to change the codec that is to be used.

In an implementation, the call is established with a first codec (e.g., EVRC-B, narrowband), and in-band signals are sent from the terminating (i.e., receiving) station to the originating mobile station. The in-band signals are indicative that the terminating station can operate with a second codec (e.g., EVRC-WB, wideband) and are used to probe whether the originating station can also operate with the second codec. If the originating station detects and reacts to the in-band signals, then both stations communicate with the second codec. The second codec enhances user call experience and has compatible packet sizes of the deployed (first) codec without any need of infrastructure upgrade and/or quality compromise to legacy phone users (i.e., stations that cannot operate with the second codec). Thus, in an implementation, in-band signaling is used to determine the capabilities of the stations and/or to set the codec mode to wideband or narrowband. The switching between the codec modes is not visible to the infrastructure.

In an implementation, the in-band signals are designed such that (a) they are not received as a valid packet by a legacy decoder (e.g., a decoder that only operates in the first codec mode, such as a EVRC-B decoder, or a decoder that does not operate in the codec mode indicated by the in-band signals transmitted by the terminating station) and (b) if they reach the receiver of a station that can operate in the second codec mode, the station can reliably conclude that (1) the transmission path is transcoding free and (2) the station on the other side is also operable in the second codec mode so that it will switch (or be ready to switch) to use the second codec. The in-band signals are transmitted periodically for a limited time frame to minimize the quality impact to legacy phone users.

The call may be established in a packet switched network, such as cdma2000 1x. A transcoder-free operation (TrFO) call may transit to a non-TrFO call in various scenarios, like when a third party joins in the middle of the call (three-party calling) or when call waiting or call forwarding is initiated. In an implementation, the mobile stations are equipped with the means (e.g., through call processing messages) to detect the network transition from TrFO to non-TrFO during a call and switch back to using the first codec (e.g., EVRC-B, narrowband).

Each mobile station may be capable of communicating with packet switched networks and circuit switched networks. It is contemplated and hereby disclosed that the configurations disclosed herein may be adapted for use in networks that are packet switched (for example, wired and/or wireless networks arranged to carry audio transmissions according to protocols such as VoIP) and/or circuit switched. It is also contemplated and hereby disclosed that the configurations disclosed herein may be adapted for use in narrowband coding systems (e.g., systems that encode an audio frequency range of about four or five kilohertz) and for use in wideband coding systems (e.g., systems that encode audio frequencies greater than five kilohertz), including whole-band wideband coding systems and split-band wideband coding systems. Example combinations include circuit switched air interface and circuit switched core network, circuit switched air interface and packet switched core network, and IP access and packet switched core network, for example.

Figure 2:
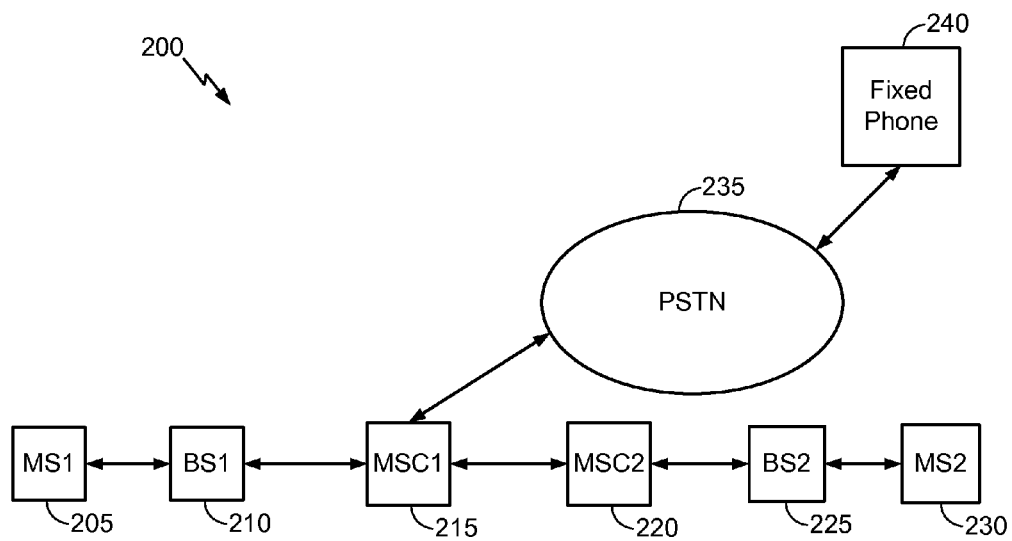
FIG. 2 is a diagram of an example network infrastructure.

FIG. 2 is a diagram of an example circuit switched network 200. The network 200 comprises mobile stations 205, 230 (MS1, MS2), base stations 210, 225 (BS1, BS2), mobile switching centers 215, 220 (MSC1, MSC2), a public switched telephone network 235 (PSTN), and a fixed phone 240. The MSCs 215, 220 may support circuit switched services (e.g., voice) and may perform radio resource management, mobility management, and other functions to support communications for the mobile stations 205, 230 with circuit switched calls. It is contemplated that wideband service may be used for a mobile to mobile call in an implementation if the network can operate in TFO.

Modern Second Generation (2G) and Third Generation (3G) radio telephone communication systems have sought to produce voice quality commensurate with the conventional PSTN. The PSTN has traditionally been limited in bandwidth to the frequency range of 300-3400 kHz. New networks for voice communications, such as cellular telephony and VoIP, are not necessarily constrained by the same bandwidth limits. Accordingly, it may be desirable to transmit and receive voice communications that include a wideband frequency range over such networks. For example, it may be desirable to support an audio frequency range that extends down to 50 Hz and/or up to 7 or 8 kHz. It may also be desirable to support other applications, such as high-quality audio or audio/video conferencing, that may have audio speech content in ranges outside the traditional PSTN limits. Codecs which seek to extend the audio frequency range as set forth above are commonly referred to as wideband codecs.

Figure 3:
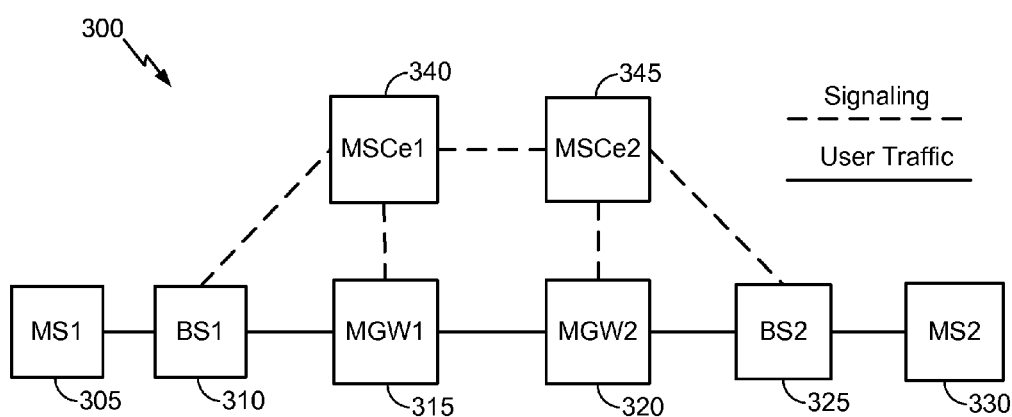
FIG. 3 is a diagram of another example network infrastructure.

FIG. 3 is a diagram of an example packet switched network 300. The network 300 comprises mobile stations 305, 330 (MS1, MS2), base stations 310, 325 (BS1, BS2), mobile switching center emulations 340, 345 (MSCe1, MSCe2), and media gateways 315, 320 (MGW1, MGW2). The MGWs 315, 320 may be translation devices or services that convert digital media streams between disparate telecommunications networks such as PSTN, SS7, Next Generation Networks (2G, 2.5G and 3G radio access networks) or PBX. Media gateways enable multimedia communications across Next Generation Networks over multiple transport protocols such as Asynchronous Transfer Mode (ATM) and Internet Protocol (IP). The MGWs 315, 320 may convert between different transmission and coding techniques. Media streaming functions such as echo cancellation, DTMF, and tone sender are also located in the media gateway. The MSCes 340, 345 may emulate a mobile switching center (MSC) for call processing.

Circuit switched networks and packet switched networks are well known and a further description is omitted for brevity. The networks 200 and 300 are not limited to the components shown and may comprise more or fewer mobile stations, base stations, mobile switching centers, mobile switching center emulations, media gateways, and fixed phones, for example, and may comprise alternative and/or additional components not shown.

The collection of base stations, mobile switching centers, mobile switching center emulations, and media gateways, if any, may be referred to as "infrastructure". To enable a new codec, conventionally the infrastructure of the network needs substantial changes to ensure interworking and interoperability. Conventionally, to enable EVRC-WB, for example, other than the enhancement of the mobile station, almost all of the entities of the network infrastructure, including the base station, the mobile switching center or mobile switching center emulation and media gateway and the signaling and protocols between the interfaces are required to be upgraded.

However, in an implementation, if the network operates in transcoder-free operation (TrFO), i.e., the audio packets are able to be delivered from one end to the other unaltered, and the end users involved in the conversation are able to have EVRC-WB quality if both of them are using mobile stations as described herein, without any infrastructure upgrade. A TrFO system over cdma2000 1x may be implemented using the network shown in FIG. 3, for example. A TrFO call may transit to a non-TrFO call in various scenarios, such as when a third party joins in the middle of the call. As described herein, a station is able to immediately detect such events and switch back to use a negotiated codec (i.e., the codec used in the completion of the call setup) before the onset of such event.

In an implementation, a call is established between a first mobile station and a second mobile station. It is determined if both mobile stations are "special" as defined herein. If so, a wideband mode is entered into, and otherwise a narrowband mode is entered into. As described further herein, in-band signaling may be used along with probes and/or protocols in order to determine the capabilities of the mobile stations (e.g., whether one or more of the mobile stations is special) and/or to set a particular codec mode (e.g., wideband or narrowband). The switching between the modes is not visible to the infrastructure. Thus, the infrastructure continues to operate as if in a first mode (e.g., previously negotiated or deployed mode, such as narrowband) even when the mode has been set to wideband or to another enhanced mode.

More particularly, end-to-end in-band signaling is used to deploy or otherwise enable a codec which enhances user call experience and has compatible packet sizes of the deployed negotiated codec without any need of infrastructure upgrade and/or quality compromise to legacy phone users (i.e., users of mobile stations or non-mobile stations that do not have the in-band signaling functionality described herein and thus are not "special").

In-band signaling may also be used to determine, acquire, or send the operation status of the network (e.g., whether it is TrFO or non-TrFO operation). Identifiers may be used to indicate the operation status.

In an implementation, the infrastructure may comprise VoIP components so that one or both stations of the call are VoIP clients. For example, a mobile station may communicate with a VoIP station via an infrastructure comprising a base station and a MSC (or MSCe and MGW) as set forth above in communication with a VoIP gateway via an IP cloud. The VoIP gateway may communicate with the VoIP client. In this manner, a mobile station may communicate with a VoIP station which may be non-mobile. The in-band signaling techniques set forth herein may be used to deploy a codec for the mobile station and the VoIP station to use for a call that has been setup between the two stations.

Figure 4:
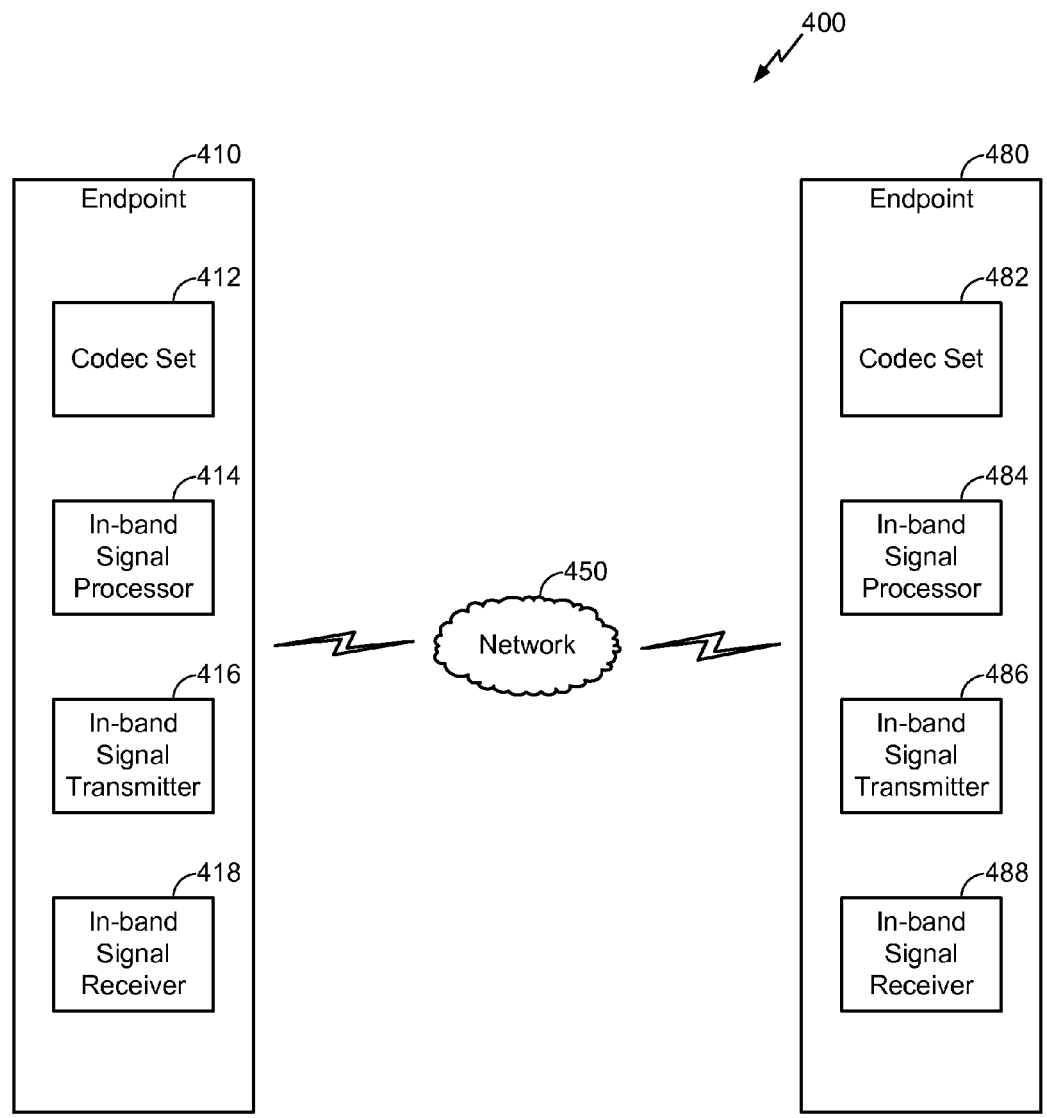
FIG. 4 is an illustration of another example environment for providing codec deployment using in-band signals.

FIG. 4 is an illustration of another example environment 400 for providing codec deployment using in-band signals. Endpoint 410 and endpoint 480 (also referred to as stations) are communication devices that communicate with each other via a network 450. Each endpoint 410, 480 may be a mobile station as described above for example (e.g., running circuit switched voice or VoIP), or may be a non-mobile station such as a personal computer (PC) or a telephone for example. In other words, each endpoint 410, 480 can be any terminal or computing device adapted for communication with another endpoint over the network 450. An example computing device that may comprise a non-mobile station, for example, is described with respect to FIG. 12.

Each endpoint 410, 480 comprises a codec set 412, 482, an in-band signal processor 414, 484, an in-band signal transmitter 416, 486, and an in-band signal receiver 418, 488, similar to that described with respect to FIG. 1. As described further herein, each codec set 412, 482 has a number of codecs that can be selectively enabled for processing audio data, and the codec set 412 may be the same or different as the codec set 482. Any number and types of codecs can be used without departing from the spirit of the invention.

Similar to the functionality described with respect to FIG. 1, for example, each in-band signal processor (e.g., processor 414) may generate in-band signals for transmission from the in-band signal transmitter (e.g., transmitter 416) to the other endpoint (e.g., endpoint 480) via the network 450, and may process in-band signals received via the in-band signal receiver (e.g., receiver 418) from the other endpoint. Each in-band signal processor, in-band signal transmitter, and in-band signal receiver may be implemented using one or more computing devices such as the computing device 1200 illustrated in FIG. 12.

As described further herein, after a call is established between the two endpoints 410, 480 using a codec that has been negotiated during call setup, in-band signaling may be used between the two endpoints 410, 480 to change the codec that is to be used. In an implementation, the call is established with a first codec and in-band probe signals are sent from the terminating endpoint to the originating endpoint to probe whether the originating endpoint can also operate with the second codec. If the originating endpoint detects and reacts to the in-band signals, then both endpoints communicate with the second codec. There is no need of infrastructure upgrade and/or quality compromise to users of endpoints that cannot operate with the second codec. Thus, in an implementation, in-band signaling is used to determine the capabilities of the endpoint and/or to set the codec mode. The switching between the codec modes is not visible to the infrastructure.

The network 450 can be any network, depending on the implementation. The network 450 may comprise any combination of the access and core network, and the access network of endpoint 410 can be different from that of endpoint 480. For example, the access network can be 1x, DO, UMTS, DSL, etc. The core network could be circuit switched domain, packet switched domain, IP, etc.

The in-band signaling techniques allow an endpoint to determine if the other endpoint also has the in-band signaling solution (i.e., is special as described herein) and if the network delivers packets end-to-end without alternation and so that codec deployment and/or switching using the techniques herein is possible. Although the techniques described herein do not need to be aware of the actual network, some knowledge of the network may be beneficial depending on the implementation. For example, for a 1x access network, if the endpoint knows ahead that a three-way call will happen by examining L3 signaling, it can initiate a transition from one codec to another codec (e.g., from EVRC-WB to EVRC-B) ahead of time, rather than rely on received speech packets, so that the transition is more smooth and the user experience is better.

Figure 5:
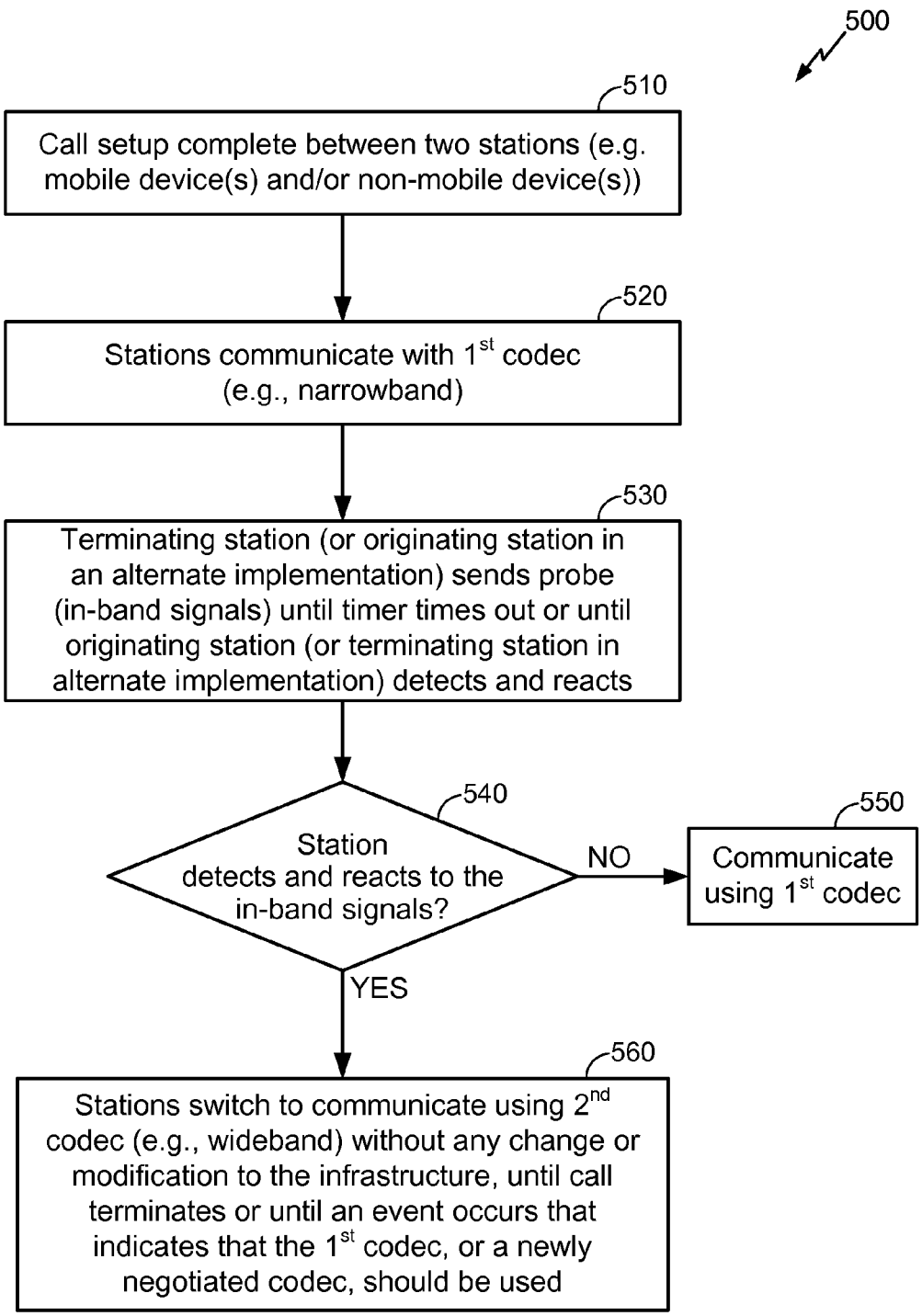
FIG. 5 is an operational flow of an implementation of a method for providing codec deployment using in-band signals.

FIG. 5 is an operational flow of an implementation of a method 400 for providing codec deployment using in-band signals. At 510, a call setup is completed between two stations (also referred to as endpoints), such as mobile station 110 and mobile station 180 or endpoint 410 and endpoint 480. For example, mobile station 110 may be the originating station and mobile station 180 may be the terminating station, or endpoint 410 may be the originating station and endpoint 480 may be the terminating station. Each station may be a mobile device or a non-mobile device.

Upon call setup, the originating station and the terminating station communicate at 520 using a previously negotiated codec, referred to as a first codec, such as a narrowband codec. The previously negotiated codec may be a predetermined codec that is to be used by stations on the network. Any station on the network may use the previously negotiated codec, including legacy stations which are stations that are not equipped with the in-band signaling functionality and features described herein.

At 530, the terminating station (if it is a special station with in-band signaling functionality) generates in-band signals and sends the in-band signals as a probe to the originating station. The in-band signals are indicative that the terminating station can operate with a second codec (e.g., wideband) and are used to probe whether the originating station can also operate with the second codec. The in-band signals may be used to determine whether the network operates in a non-transcoding mode, in an implementation. The in-band signals may be sent when speech is detected or when the terminating station picks up, for example. Thus, the in-band signaling is only sent after the call has been established. In an implementation, the terminating station starts a timer when it begins sending the in-band probe signals. The timer may be used to determine the length of time that the terminating station sends the in-band probe signals. The terminating station may stop transmitting the in-band probe signals after a predetermined length of time if there has been no response from the originating station.

At 540, it is determined at the terminating station whether the originating station has detected and reacted to the in-band signals sent by the terminating station. It may be determined that the originating station has detected and reacted to the in-band signals if the originating station generates and sends a response using in-band signaling to the terminating station.

At 550, if the originating station fails to respond to the in-band probe signals sent by the terminating station (e.g., within the predetermined amount of time as measured by the timer), then communication between the two stations continues using the originally negotiated codec. In this manner, because the originating station did not react to the in-band probe signals, the originating station is not considered to have the capability to operate in the second codec. This may happen, for example, if the network does not operate in a non-transcoding mode, and/or if the originating station is not a special station. Thus, users of legacy stations may still call and communicate with stations that can operate with the second codec (special stations).

At 560, if the originating station does detect and respond to the in-band probe signals, e.g. by sending a confirmation signal to the terminating station, then the stations switch to communicate using the second codec without any change or modification to the infrastructure. The second codec enhances user call experience and has compatible packet sizes of the deployed (first) codec without any need of infrastructure upgrade. The switching between codec modes and the use of the second codec mode is not visible to the infrastructure. Thus, the infrastructure remains running in the first codec mode. Communication proceeds using the second codec until the call terminates or until an event occurs that indicates that the first codec (or another codec such as a newly negotiated codec) should be used instead of the second codec, as described further with respect to FIGS. 8 and 9, for example. Thus, in-band signaling is used to determine the capabilities of the stations and/or to set the codec mode, e.g. to wideband or narrowband.

In an implementation, to be able to run EVRC-WB on EVRC-B, TrFO is in place. The protocol and signals, described herein, achieve the switch from EVRC-B to EVRC-WB upon completion of call setup and switch back to EVRC-B when TrFO is broken. EVRC-B and SO 68 (service option 68) are used interchangeably herein, as are EVRC-WB and SO 70 (service option 70).

In an implementation, a special station is capable of supporting both EVRC-B (SO 68) and EVRC-WB (SO 70), and generating, detecting, and reacting to special in-band signals, including a probe signal, an acknowledgement to probe signal, a change to wideband signal and a change to narrowband signal, for example, and performing additional operations before responding to some of the Layer 3 messages.

Figure 6:
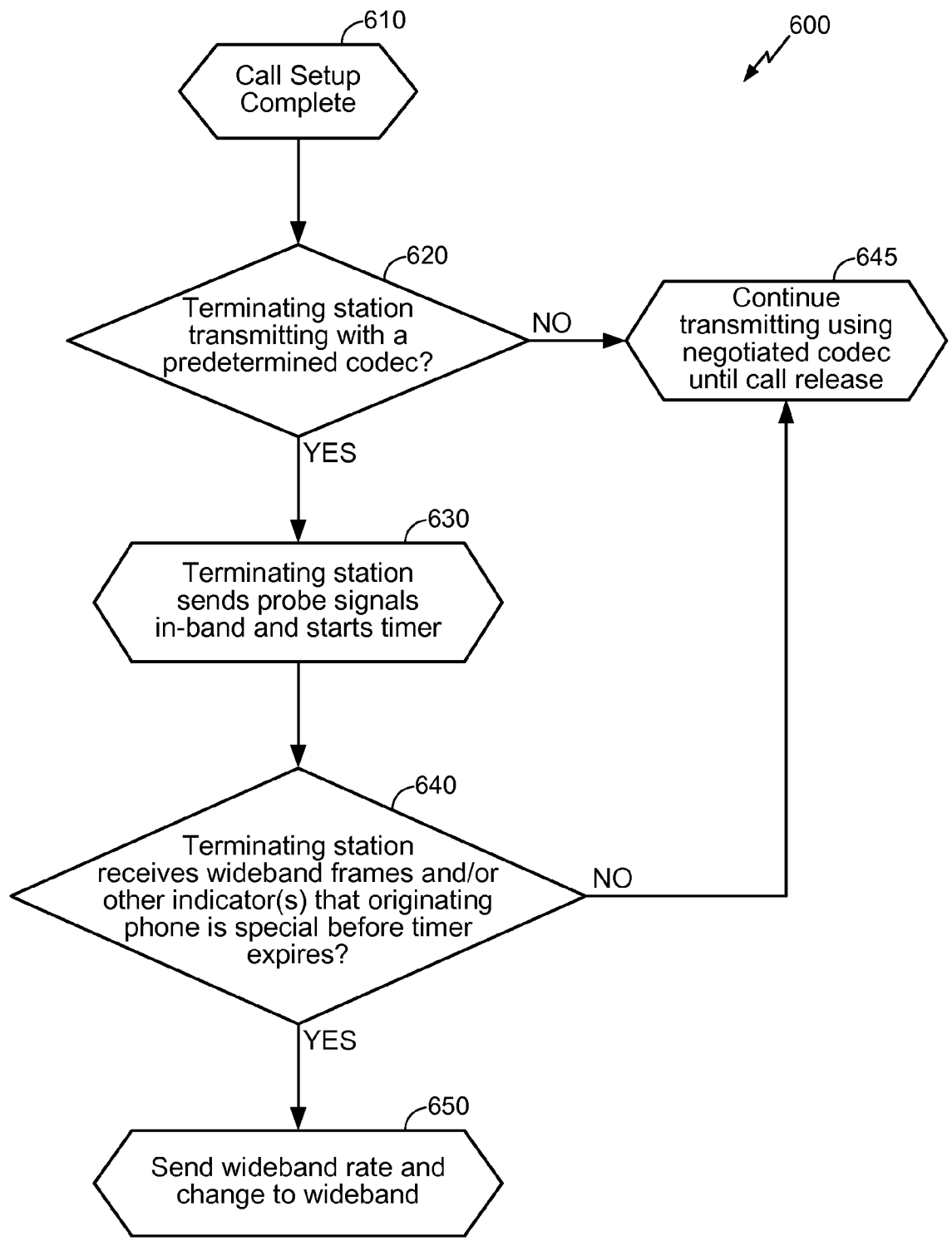
FIG. 6 is an operational flow of an implementation of a method for switching from a first codec to a second codec with respect to a terminating station.
Figure 7:
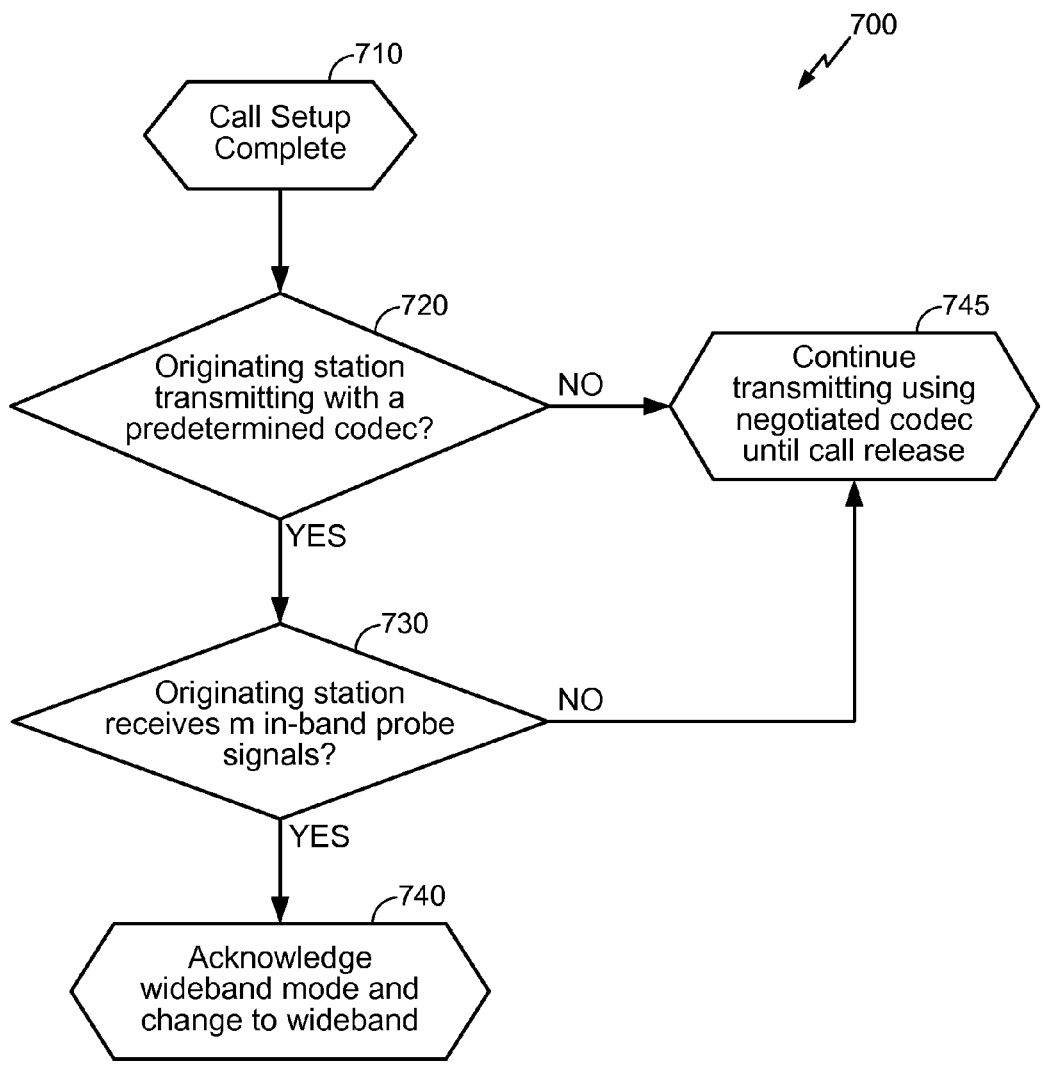
FIG. 7 is an operational flow of an implementation of a method for switching from a first codec to a second codec with respect to an originating station.

Take enabling EVRC-WB on EVRC-B over cdma2000 1x as an example. FIGS. 6 and 7 illustrate the procedures of terminating and originating stations immediately after call setup. FIG. 6 is an operational flow of an implementation of a method 600 for switching from a first codec, such as EVRC-B, to a second codec, such as EVRC-WB, with respect to a terminating station. FIG. 7 is an operational flow of an implementation of a method 700 for switching from the first codec to the second codec with respect to an originating station.

FIG. 6 provides an example terminating station procedure after call setup, assuming the terminating station is a special station. At 610, a call setup is considered complete after two stations negotiate a call and the call is setup. After the call setup is complete at 610, it may be determined at 620 if the terminating station is transmitting with a particular predetermined service codec, such as EVRC-B SO68 COP0 (corresponding to narrowband, operating at capacity operating point 0), for example. SO68 defines a particular codec (e.g., narrowband), and COP0 defines an average rate that it is targeting. COP0 may be a pre-requisite in some implementations because the average data rate of COP0 is greater than or equal to that of EVRC-WB COP0 (the wideband mode). Any of the other COPs of EVRC-B has an average data rate less than that of EVRC-WB, so if EVRC-B COP4 is switched to EVRC-WB, for example, channel capacity might be negatively impacted. In an implementation, the station provides a list of supported codes it can support to the base station. The base station then tells the station which codec to use. If the predetermined codec is not being used, and another codec is, then communication continues at 645 using the codec that was originally negotiated.

However, if the terminating station is special, and if the negotiated service codec is the predetermined service codec (e.g., EVRC-B SO68 COP0) as determined at 620, then the terminating station starts sending an in-band probe signal periodically and sets a timer at 630. In an implementation, the in-band signal is sent once every 16 frames, for example. The in-band signal that is sent from the terminating station to the originating station indicates that the terminating station is special. The in-band signal is only sent for an amount of time set by the timer (e.g., 20 seconds). When the timer expires, the terminating station stops sending the in-band signal.

Thus, in an implementation, the terminating station immediately after the completion of call setup, starts sending a probe signal once every predetermined number of frames and sets a timer, if the terminating station is special and the negotiated service option meets the predetermined criteria. The probe signal is transmitted in-band. For example, each time a probe needs to be transmitted, if the normal frame is full rate or eighth rate, a full rate probe is used to replace the normal frame, and if the normal frame is a half rate, a half rate probe is used to replace the normal frame.

Before the timer expires, at 640, if the terminating station receives an acknowledgement which indicates the originating station is also special and that the originating station has reliably detected the probe signal, it sends a change to wideband mode signal and enters normal EVRC-WB operation at 650 (e.g., it switches its speech encoder to EVRC-WB and sends wideband full rate packets). The acknowledgement may be an indication that comprises a special signal, an in-band signal, or a sequence of wideband frames based on packet structure, for example (e.g., no quarter rate structure). Otherwise, either the originating station is a legacy station or the probe signal is not reliably detected by the originating station in time before the timer expires; thus, even though the terminating station is a special phone, at 645, the terminating station remains in the original codec mode until call release.

Turning to FIG. 7, after call setup is complete at 710, it is determined at 720 if the originating station is special, and if the negotiated service codec is a predetermined service codec (e.g., SO 68 COP 0), for example. If the predetermined codec is not being used, and another codec is, then communication continues at 745 using the codec that was originally negotiated. In such a case, the receiver of the originating station does not need to detect the probe and just treats the probe as an erasure, as in a normal decoding process. Otherwise, the receiver shall enable the probe detection procedure while monitoring the received frame type.

If the negotiated service codec is determined at 720 to be the proper predetermined service codec, it may be determined at 730 whether its receiver successfully detects a number m of in-band probe signals, where m may be any predetermined integer, such as 1 or 2, for example. If so, then the originating station sends an acknowledgement of the wideband mode to the terminating station and switches its speech encoder to the wideband mode (e.g., EVRC-WB) and starts sending wideband full rate packets, at 740. Otherwise, the originating station continues transmitting in the negotiated codec mode at 745. Thus, if the originating station is a legacy station, then its receiver processes the received packets as usual. Each probe is treated as an erasure as the "delay index" field does not contain a valid value.

Thus, if m probes are received (which implies this is a TrFO scenario and the terminating station is special), then the originating station sends an acknowledgement signal and enters the EVRC-WB mode at 740.

As noted above, probe signaling is transmitted by the terminating station right after call setup, if it is a special phone. In an implementation, the probe signaling is either a full rate (171 bits) or a half rate (40 bits) frame carrying a unique message.

The acknowledgement probe signaling is transmitted by the originating station after it detects probe signaling, if it is a special phone. The acknowledgement probe signaling may comprise consecutive EVRC-WB full rate frames, for example.

The change to wideband signaling is transmitted by the terminating station after it detects the acknowledgement probe signaling received from the originating station. The change to wideband signaling may comprise consecutive EVRC-WB full rate frames.

In an implementation, the change to narrowband signaling is transmitted by either the terminating station or the originating station when it is in EVRC-WB mode and detects any trigger indicating that transcoding free operation is going to be broken, as described further below with respect to FIGS. 8 and 9. The change to narrowband signaling could be an acknowledgement to probe signaling consisting of consecutive EVRC-B full rate frames or some other signaling carrying some special messages that can be reliably detected by a special station.

Figure 8:
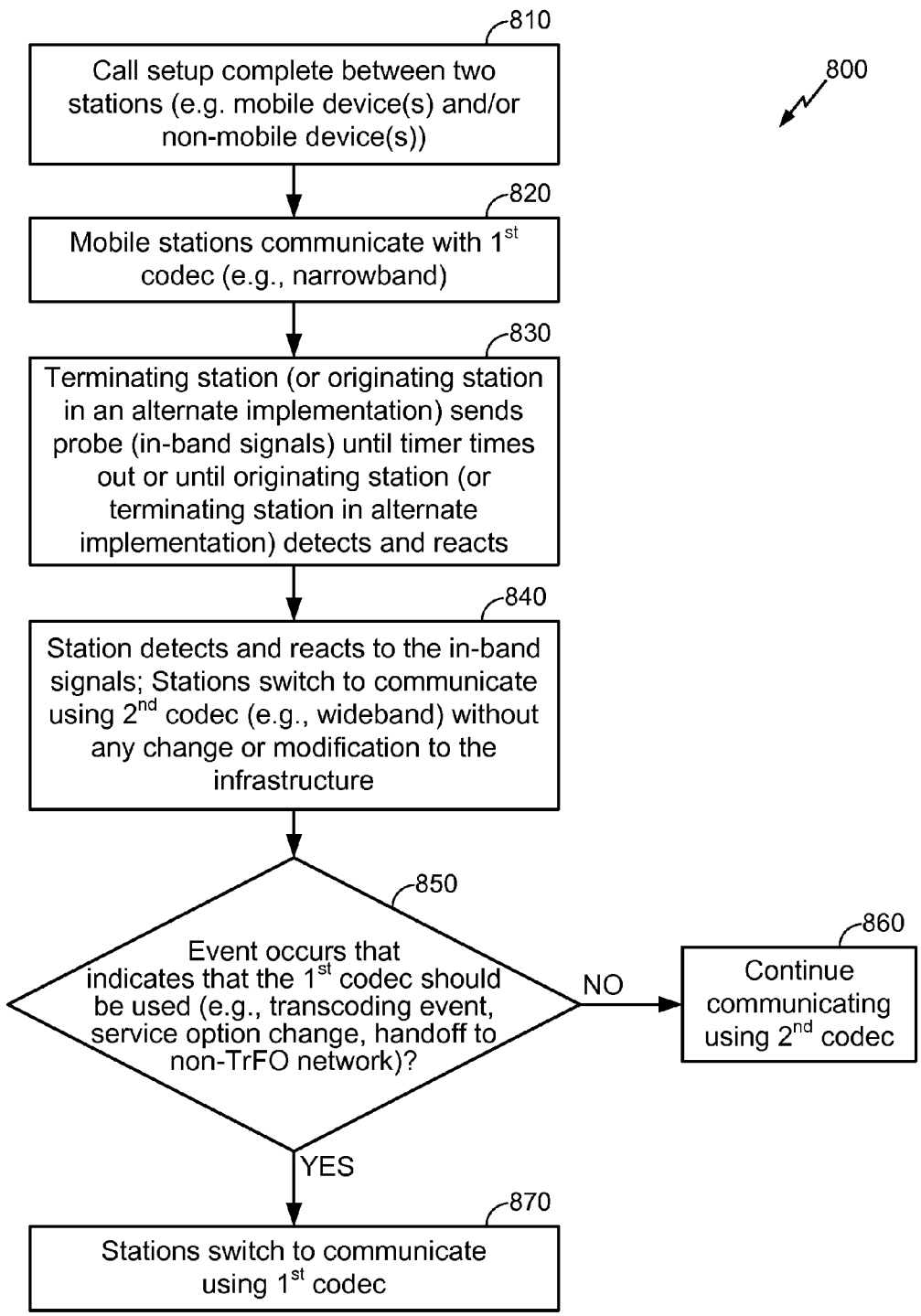
FIG. 8 is an operational flow of another implementation of a method for providing codec deployment using in-band signals.

FIG. 8 is an operational flow of another implementation of a method 800 for providing codec deployment using end-to-end signals and protocols. At 810 and 820, similar to 510 and 520, a call setup is completed between two stations, and the originating station and the terminating station communicate using a previously negotiated codec.

At 830, similar to 530, the terminating station generates in-band signals and sends the in-band signals as a probe to the originating station for a predetermined amount of time or until the originating station responds. At 840, the originating station detects and reacts to the in-band signals sent by the terminating station. The stations switch to communicate using the second codec, without any change to the network infrastructure.

Continuously during the communication between the stations using the second codec, at 850, it may be determined if an event occurs that indicates that the first codec (originally negotiated codec) should be used instead of the second codec. Such an event may be a transcoding event, a service option change, or a handoff to a non-TrFO network, for example.

If such an event occurs, then the stations switch back to using the originally negotiated codec at 870. Otherwise, communication continues between the two stations at 860 using the second codec.

In an implementation where the call is switched from EVRC-B to EVRC-WB and before the call is released, both the terminating station and the originating station monitor the received traffic and the Layer 3 signal. The Layer 3 signal is transmitted to sense any sign that TrFO might be about to be broken or is broken. One sign that TrFO is possibly broken is that a narrowband frame (e.g., quarter rate frame, full rate frame with the last bit being '0', eighth rate frame with the last bit being '0', special half rate frame, etc.) is received. In this case, either one of the stations initiates the switch from EVRC-WB to EVRC-B or at least one of the stations is handed off to a network that does not support TrFO. Therefore, transcoding begins, the speech encoder transmits a change to narrowband signal immediately, followed by sending normal EVRC-B packets, and the audio output is muted for a predetermined number of frames before it processes the received frame in normal narrowband mode. If the receiver can reliably detect a change to narrowband signal, it can immediately process the received frame in normal narrowband mode without audio output muting.

Additional indications that TrFO is about to be broken include receiving a service negotiation message (including Service Connect Message, Service Option Control Message, Service Request Message, Service Response Message, General Handoff Direction Message, and Universal Handoff Direction Message, for example) or a service option negotiation message (including Service Option Request Order, Service Option Response Order, and Service Option Control Order, for example) which requires vocoder change and/or COP change, an alert or flash with information message (e.g., call waiting tone). In addition to an alert with information message, flash with information message, or handoff message, the alert, flash, or handoff may be of the "extended" type (e.g., an extended alert, extended flash, or extended handoff in which the alert, flash, or handoff is an extended message). In these scenarios, the speech encoder sends a change to narrowband signal, followed by normal EVRC-B process. Additionally, if one station detects its user wants to initiate three-party calling or sending DTMF tones, it sends a change to narrowband signal, possibly followed by normal EVRC-B process, before sending flash with information message (dialed digits) or sending burst DTMF Message. An example procedure of a special station in EVRC-WB is shown with respect to FIG. 9.

Figure 9:
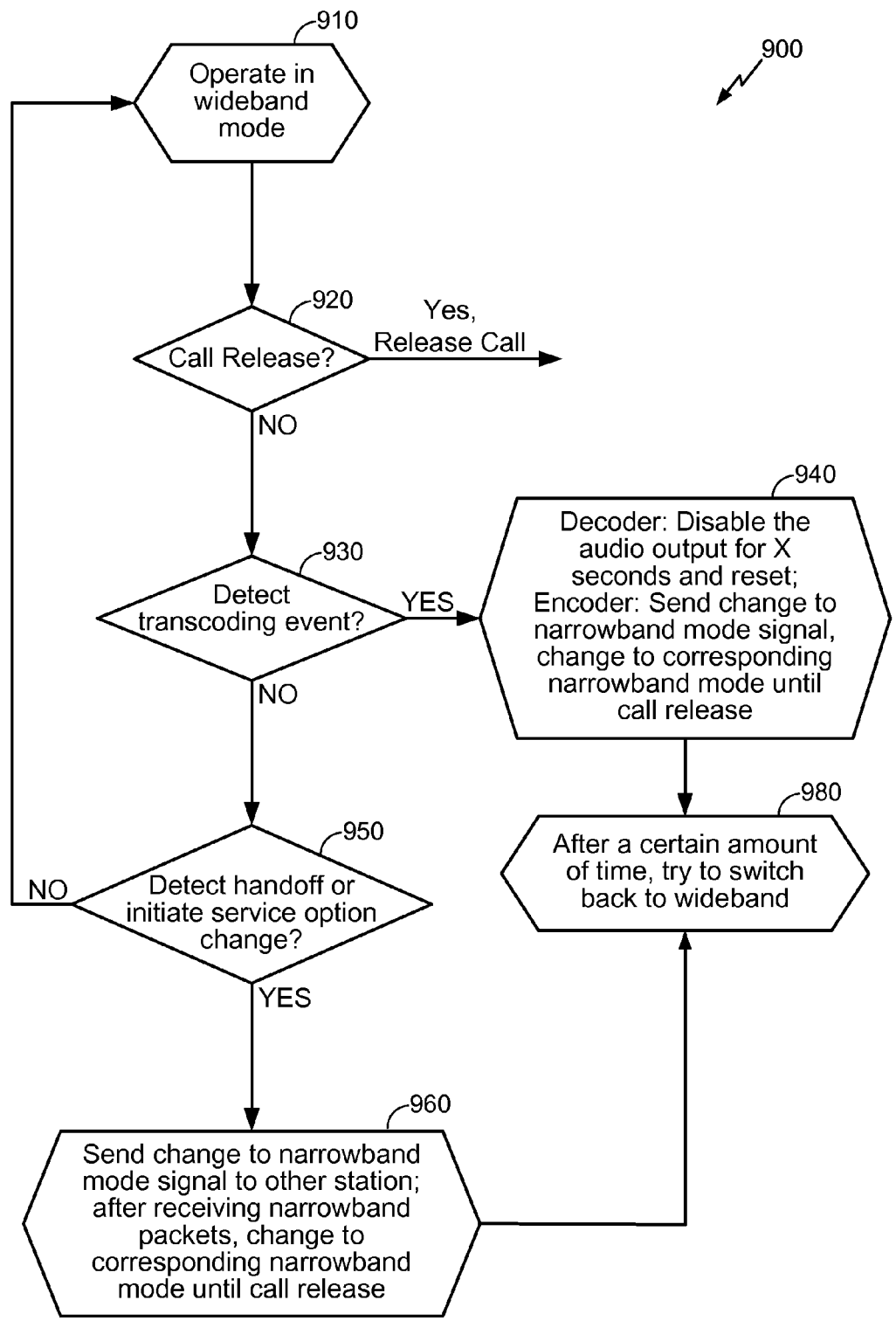
FIG. 9 is an operational flow of an implementation of a method for switching between codecs with respect to an originating station or a terminating station.

FIG. 9 is an operational flow of an implementation of a method 900 for switching between codecs, such as from EVRC-WB to EVRC-B, with respect to an originating station or a terminating station. FIG. 9 describes procedures that two special stations follow in an implementation to switch between two codecs.

At 910, the communication continues in wideband mode after having been set to the wideband mode as described above for example, and it may be determined at 920 if the call is released. If not, at 930, it may be determined if a transcoding event occurs, such as call waiting occurs, third party adding, one of the stations moves to a non-TrFO network. For example, a few valid quarter rates may be received which indicates a move to a non-TrFO network. If so, then at 940, for the decoder, the audio output is disabled for a predetermined amount of seconds (X seconds, where X is >0 and predetermined) and reset, and for the encoder, a change to narrowband signal is sent to change it to the corresponding narrowband mode until call release. Optionally, at 980, after a certain amount of time, the stations may try to switch back to wideband mode again, e.g., using in-band signaling as described herein.

At 950, it may be determined if a handoff is detected or if a service option change has been initiated, e.g., if a message is being transmitted or received that gives an indication that another party is being included in the call or a service option is changing, to indicate a handoff to a non-TrFO mode. If so, then at 960, the station sends change to narrowband mode signals to the other station, and after receiving narrowband packets the station changes to the corresponding narrowband mode until call release. Thus, the technique triggers back to narrowband if a party using one of the stations initiates call forwarding, call waiting, or third party calling. Otherwise, processing may continue at 910.

In an implementation, if a station wants to initiate three-party calling, it switches its speech encoder to EVRC-B, sends full rate packets until its speech decoder switches to narrowband, starts sending normal EVRC-B packets, and then sends flash with information message (dialed digits). Similarly, before a station sends a send burst DTMF message, it switches its speech encoder to EVRC-B, sends full rate packets until its speech decoder switches to narrowband, starts sending normal EVRC-B packets, and then sends a send burst DTMF message. If a station receives an alert or flash with information message (call waiting tone), it switches its speech encoder to EVRC-B, sends full rate packets until its speech decoder switches to narrowband, starts sending normal EVRC-B packets and proceeds with the subsequent operations after receiving the alert or flash with information message.

If a station receives a predetermined number of consecutive narrowband frames (including full rate frame with 171st bit=0, eighth rate frame with 16th bit=0, quarter rate frame, and half rate frame following any type of these frames), the speech decoder considers the narrowband frames (starting from the second narrowband frame) as erased frames, and the encoder switches to EVRC-B and sends change to narrowband signals before sending normal EVRC-B packets. In an implementation, during the transmission of change to wideband signals, change to narrowband signals, or acknowledge probe signals, the station may use forward traffic channel supervision to adjust its transmission duration accordingly.

In an implementation directed to third party adding (an example of a transcoding event), a call may be established between two stations, and the two stations may negotiate a first codec to use, such as EVRC-B. At some point, the two stations switch to using a second codec, such as EVRC-WB (e.g., at 910). During the call, it is determined to include a third station on the call (e.g., make the call a three-way call with a third station) (e.g., at 930). To include the third station, the two stations fallback to using the first codec (e.g., at 940). At some point, the three-way call is terminated (the third station terminates being on the call), and the two stations switch back to using the second codec.

Implementations described herein (e.g., with respect to the methods 500 through 800) describe the terminating station sending the in-band probe signals to the originating station. However, alternatively or additionally, the originating station may send the in-band probe signals to the terminating station. In such implementations, the terminating station, if it is not a legacy station, may detect and respond to the in-band signals sent by the originating station.

In an implementation, one station may be equipped so that it sends in-band probe signals regardless of whether it is the originating station or the terminating station. However, the station can communicate with another station which only sends the in-band signal when it is the terminating station, such as for example when a PC client is communicating with a mobile device.

Figure 10:
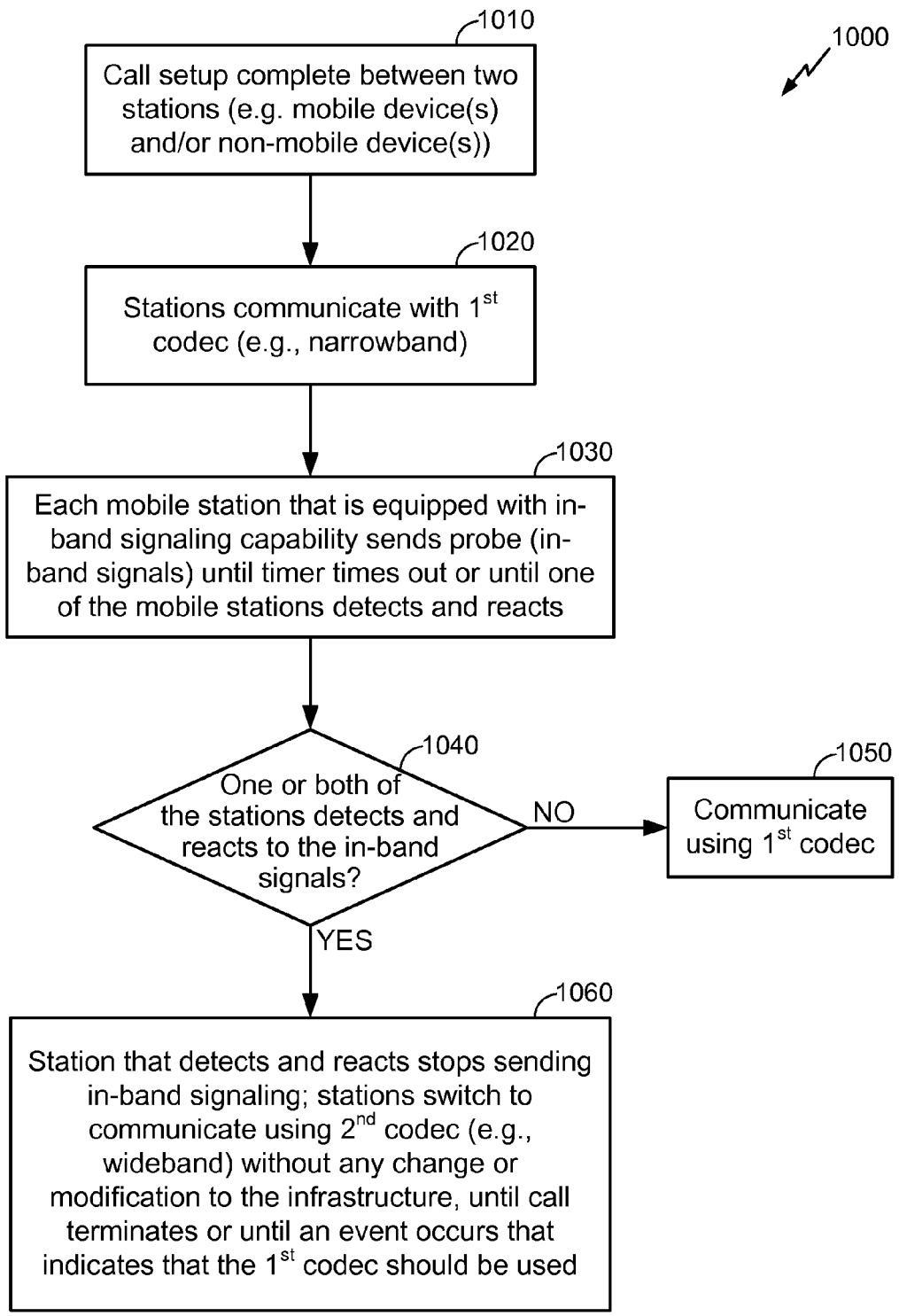
FIG. 10 is an operational flow of another implementation of a method for providing codec deployment using in-band signals.

FIG. 10 is an operational flow of another implementation of a method 900 for providing codec deployment using in-band signals. At 1010 and 1020, similar to 510 and 520, a call setup is completed between two stations, and the originating station and the terminating station communicate using a previously negotiated codec.

At 1030, each station that is equipped with the in-band signaling capability generates in-band signals and sends the in-band signals as a probe to the other station. Depending on how each station is equipped (e.g., whether a station is a legacy station or a special station, as the terms are used herein), each station may be equipped to send in-band probe signals and wait for a response from the other station, or only one of the stations may be equipped to send in-band probe signals and wait for (or monitor) a response from the other station. The in-band signals are indicative that the transmitting station can operate with a second codec and are used to probe whether the other station can also operate with the second codec. In an implementation, each transmitting station (i.e., each special station) starts a timer when it begins sending the in-band probe signals. The timer may be used to determine the length of time that the transmitting station sends the in-band probe signals and the transmitting station may stop transmitting the in-band probe signals after a predetermined length of time if there has been no response from the other station. In an implementation, the probe may be used to determine whether or not transcoding is present on the transmission path and/or whether the other station is also a special station.

At 1040, it is determined at the transmitting station whether the other station has detected and reacted to the in-band signals sent by the transmitting station. It may be determined that the other station has detected and reacted to the in-band signals if it generates and sends a response using in-band signaling to the transmitting station. If both stations are transmitting in-band signals, then it may be determined if both of the stations detect and react to the in-band signals.

At 1050, if neither of the stations (if both stations are acting as transmitting stations, although it is contemplated that only one of the stations acts as a transmitting station as described further herein) detect and react to the in-band signals sent by the other station (e.g., within the predetermined amount of time as measured by the timer(s) set by the transmitting station(s)), then communication between the two stations continues using the originally negotiated codec. However, at 1060, if the one of the stations does detect and respond to the in-band probe signals, e.g. by sending a confirmation signal to the transmitting station, then the stations switch to communicate using the second codec. The switching between codec modes and the use of the second codec mode is not visible to the infrastructure. Communication proceeds using the second codec until the call terminates or until an event occurs that indicates that the first codec (or a newly negotiated codec) should be used instead of the second codec, as described further herein.

It is contemplated that all of the in-band signaling functionalities of the stations (i.e., to make them "special") can be achieved through software/firmware upgrade. The user experience is enhanced without any infrastructure upgrade and without negative impact to legacy phone users.

As used herein, the term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The term "signal processing" (and grammatical variants thereof) may refer to the processing and interpretation of signals. Signals of interest may include sound, images, and many others. Processing of such signals may include storage and reconstruction, separation of information from noise, compression, and feature extraction. The term "digital signal processing" may refer to the study of signals in a digital representation and the processing methods of these signals. Digital signal processing is an element of many communications technologies such as mobile stations, non-mobile stations, and the Internet. The algorithms that are utilized for digital signal processing may be performed using specialized computers, which may make use of specialized microprocessors called digital signal processors (sometimes abbreviated as DSPs).

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa).

Figure 11:
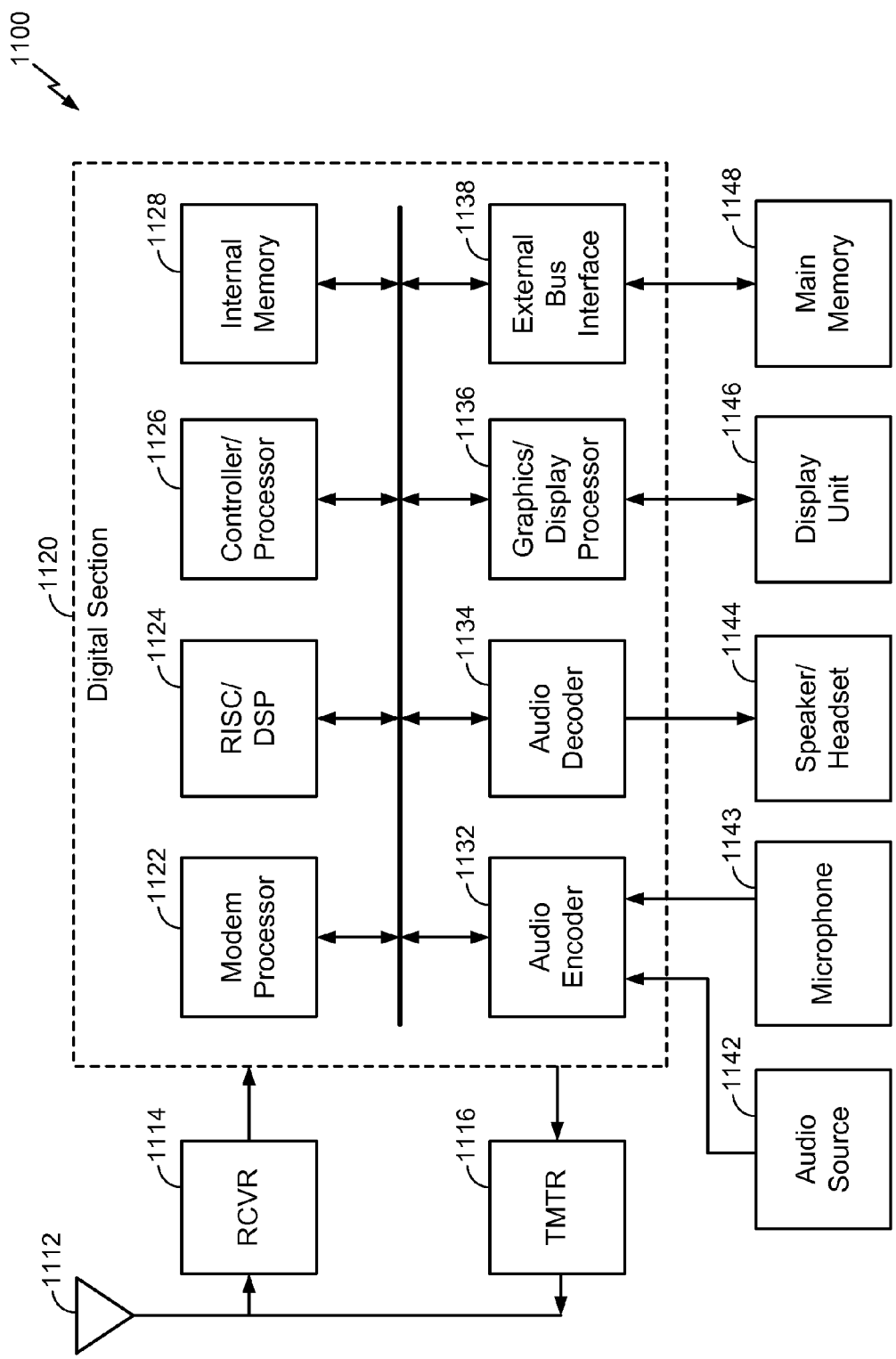
FIG. 11 is a diagram of an example mobile station.

FIG. 11 shows a block diagram of a design of an example mobile station 1100 in a wireless communication system. Mobile station 1100 may be a cellular phone, a terminal, a handset, a PDA, a wireless modem, a cordless phone, etc. The wireless communication system may be a CDMA system, a GSM system, etc.

Mobile station 1100 is capable of providing bidirectional communication via a receive path and a transmit path. On the receive path, signals transmitted by base stations are received by an antenna 1112 and provided to a receiver (RCVR) 1114. Receiver 1114 conditions and digitizes the received signal and provides samples to a digital section 1120 for further processing. On the transmit path, a transmitter (TMTR) 1116 receives data to be transmitted from digital section 1120, processes and conditions the data, and generates a modulated signal, which is transmitted via antenna 1112 to the base stations. Receiver 1114 and transmitter 1116 may be part of a transceiver that may support CDMA, GSM, etc.

Digital section 1120 includes various processing, interface, and memory units such as, for example, a modem processor 1122, a reduced instruction set computer/digital signal processor (RISC/DSP) 1124, a controller/processor 1126, an internal memory 1128, a generalized audio encoder 1132, a generalized audio decoder 1134, a graphics/display processor 1136, and an external bus interface (EBI) 1138. Modem processor 1122 may perform processing for data transmission and reception, e.g., encoding, modulation, demodulation, and decoding. RISC/DSP 1124 may perform general and specialized processing for wireless device 1100. Controller/processor 1126 may direct the operation of various processing and interface units within digital section 1120. Internal memory 1128 may store data and/or instructions for various units within digital section 1120.

Generalized audio encoder 1132 may perform encoding for input signals from an audio source 1142, a microphone 1143, etc. Generalized audio decoder 1134 may perform decoding for coded audio data and may provide output signals to a speaker/headset 1144. Graphics/display processor 1136 may perform processing for graphics, videos, images, and texts, which may be presented to a display unit 1146. EBI 1138 may facilitate transfer of data between digital section 1120 and a main memory 1148.

Digital section 1120 may be implemented with one or more processors, DSPs, microprocessors, RISCs, etc. Digital section 1120 may also be fabricated on one or more application specific integrated circuits (ASICs) and/or some other type of integrated circuits (ICs).

Figure 12:
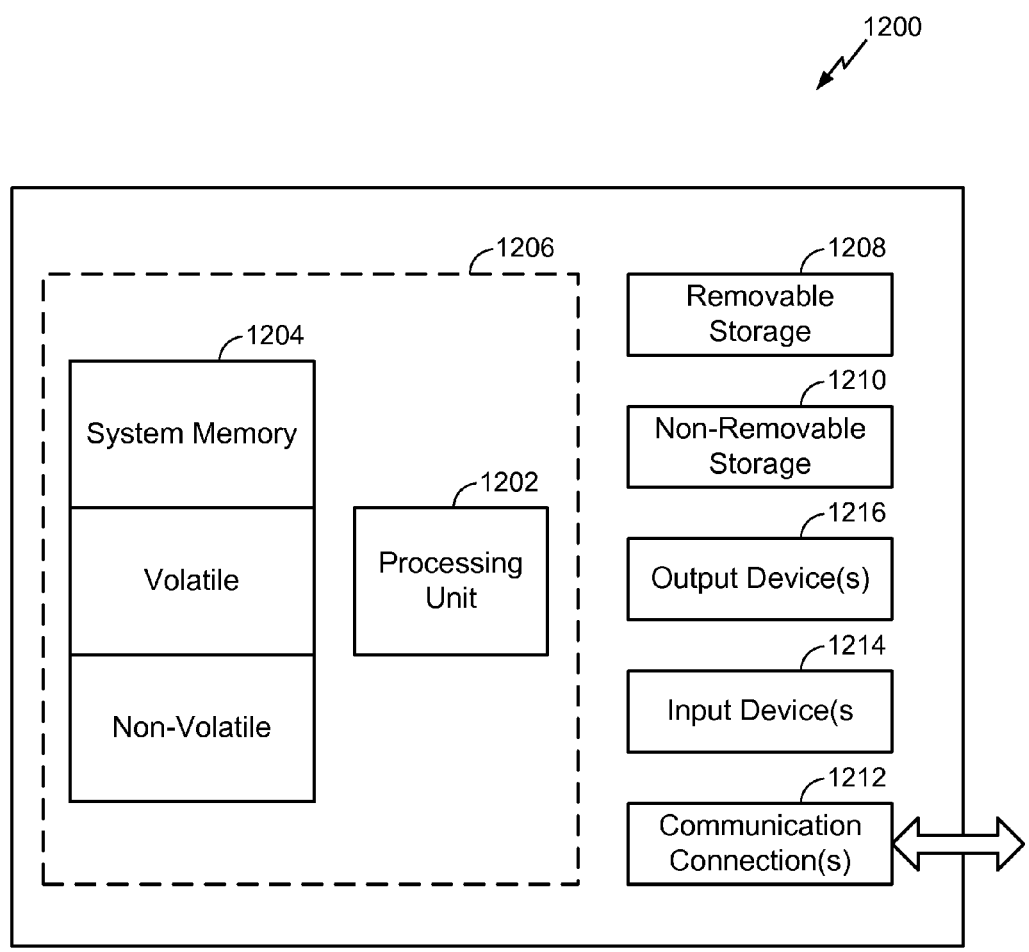
FIG. 12 shows an exemplary computing environment.

FIG. 12 shows an exemplary computing environment in which example implementations and aspects may be implemented. The computing system environment is only one example of a suitable computing environment and is not intended to suggest any limitation as to the scope of use or functionality.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 12, an exemplary system for implementing aspects described herein includes a computing device, such as computing device 1200. In its most basic configuration, computing device 1200 typically includes at least one processing unit 1202 and memory 1204. Depending on the exact configuration and type of computing device, memory 1204 may be volatile (such as random access memory (RAM)), non-volatile (such as read-only memory (ROM), flash memory, etc.), or some combination of the two. This most basic configuration is illustrated in FIG. 12 by dashed line 1206.

Computing device 1200 may have additional features and/or functionality. For example, computing device 1200 may include additional storage (removable and/or non-removable) including, but not limited to, magnetic or optical disks or tape. Such additional storage is illustrated in FIG. 12 by removable storage 1208 and non-removable storage 1210.

Computing device 1200 typically includes a variety of computer-readable media. Computer-readable media can be any available media that can be accessed by device 1200 and include both volatile and non-volatile media, and removable and non-removable media. Computer storage media include volatile and non-volatile, and removable and non-removable media implemented in any method or technology for storage of information such as computer readable instructions, data structures, program modules or other data. Memory 1204, removable storage 1208, and non-removable storage 1210 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media may be part of computing device 1200.

Computing device 1200 may contain communications connection(s) 1212 that allow the device to communicate with other devices. Computing device 1200 may also have input device(s) 1214 such as a keyboard, mouse, pen, voice input device, touch input device, etc. Output device(s) 1216 such as a display, speakers, printer, etc. may also be included. All these devices are well known in the art and need not be discussed at length here.

In general, any device described herein may represent various types of devices, such as a wireless or wired phone, a cellular phone, a laptop computer, a wireless multimedia device, a wireless communication PC card, a PDA, an external or internal modem, a device that communicates through a wireless or wired channel, etc. A device may have various names, such as access terminal (AT), access unit, subscriber unit, mobile station, mobile device, mobile unit, mobile phone, mobile, remote station, remote terminal, remote unit, user device, user equipment, handheld device, non-mobile station, non-mobile device, endpoint, etc. Any device described herein may have a memory for storing instructions and data, as well as hardware, software, firmware, or combinations thereof.

The in-band signaling and codec selection and deployment techniques described herein may be implemented by various means. For example, these techniques may be implemented in hardware, firmware, software, or a combination thereof. Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For a firmware and/or software implementation, the techniques may be embodied as instructions on a computer-readable medium, such as random access RAM, ROM, non-volatile RAM, programmable ROM, EEPROM, flash memory, compact disc (CD), magnetic or optical data storage device, or the like. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of setting a codec for use by a first station in communication with a second station, comprising:
   while on a call that is setup with the second station in a first codec mode and an infrastructure running in the first codec mode, determining at the first station that the second station is equipped to run in a second codec mode, wherein the second codec mode has compatible packet sizes with the first codec mode without a change to the infrastructure; and
   responsive to determining at the first station that the second station is equipped to run in the second codec mode:
      instructing the second station to run in the second codec mode, and
      setting the first station to run in the second codec mode, wherein instructing the second station to run in the second codec mode is not visible to the infrastructure, and wherein setting the first station to run in the second codec mode is not visible to the infrastructure.

2. The method of claim 1, wherein determining at the first station whether the second station is equipped to run in the second codec mode comprises using in-band signaling.

3. The method of claim 1, wherein determining at the first station whether the second station is equipped to run in the second codec mode comprises transmitting in-band probe signals to the second station and receiving in-band acknowledgement signals from the second station.

4. The method of claim 3, further comprising transmitting the in-band probe signals periodically for a limited amount of time.

5. The method of claim 3, wherein the first station is capable of generating, detecting, and reacting to in-band signals that are designed such that (a) the in-band probe signals are not received as any of the valid packets by a station that is unequipped to run in the second codec mode and (b) if the in-band acknowledgement signals are received by the first station, the first station determines that the transmission path is transcoding free and the second station is equipped to run in the second codec mode.

6. The method of claim 1, wherein instructing the second station to run in the second codec mode comprises sending instructions to the second station using in-band signaling.

7. The method of claim 1, further comprising, while the first station is running the second codec mode, setting the codec at the first station to the first codec mode upon detection of a network transition from transcoder-free operation (TrFO) to non-TrFO during the call.

8. The method of claim 1, wherein the first station is mobile station.

9. The method of claim 1, wherein the first station is a terminating station for the call.

10. The method of claim 1, wherein the first station is an originating station for the call.

11. The method of claim 1, wherein the first codec mode is a narrowband mode and the second codec mode is a wideband mode.

12. The method of claim 1, wherein the first station is a non-mobile station.

13. An apparatus for setting a codec for use by a first station in communication with a second station, comprising:
   means for determining at the first station that the second station is equipped to run in a second codec mode, while on a call that is setup with the second station in a first codec mode and an infrastructure running in the first codec mode, wherein the second codec mode has compatible packet sizes with the first codec mode without a change to the infrastructure; and
   means for instructing the second station to run in the second codec mode and setting the first station to run in the second codec mode, responsive to determining at the first station that the second station is equipped to run in the second codec mode, wherein instructing the second station to run in the second codec mode is not visible to the infrastructure, and wherein setting the first station to run in the second codec mode is not visible to the infrastructure.

14. The apparatus of claim 13, wherein the means for determining at the first station whether the second station is equipped to run in the second codec mode uses in-band signaling.

15. The apparatus of claim 13, wherein the means for determining at the first station whether the second station is equipped to run in the second codec mode comprises means for transmitting in-band probe signals to the second station and means for receiving in-band acknowledgement signals from the second station.

16. The apparatus of claim 15, further comprising means for transmitting the in-band probe signals periodically for a limited amount of time.

17. The apparatus of claim 15, wherein the first station is capable of generating, detecting, and reacting to in-band signals that are designed such that (a) the in-band probe signals are not received as any of the valid packets by a station that is unequipped to run in the second codec mode and (b) if the in-band acknowledgement signals are received by the first station, the first station determines that the transmission path is transcoding free and the second station is equipped to run in the second codec mode.

18. The apparatus of claim 13, wherein the means for instructing the second station to run in the second codec mode comprises means for sending instructions to the second station using in-band signaling.

19. The apparatus of claim 13, further comprising, while the first station is running the second codec mode, means for setting the codec at the first station to the first codec mode upon detection of a network transition from transcoder-free operation (TrFO) to non-TrFO during the call.

20. The apparatus of claim 13, wherein the first station is mobile station.

21. The apparatus of claim 13, wherein the first station is a terminating station for the call.

22. The apparatus of claim 13, wherein the first station is an originating station for the call.

23. The apparatus of claim 13, wherein the first codec mode is a narrowband mode and the second codec mode is a wideband mode.

24. The apparatus of claim 13, wherein the first station is a non-mobile station.

25. A non-transitory computer-readable medium comprising instructions that cause a computer to:
determine at a first station that a second station is equipped to run in a second codec mode, while on a call that is setup with the second station in a first codec mode and an infrastructure running in the first codec mode, wherein the second codec mode has compatible packet sizes with the first codec mode without a change to the infrastructure; and instruct the second station to run in the second codec mode and set the first station to run in the second codec mode, responsive to determining at the first station that the second station is equipped to run in the second codec mode, wherein instructing the second station to run in the second codec mode is not visible to the infrastructure, and wherein setting the first station to run in the second codec mode is not visible to the infrastructure.

26. The computer-readable medium of claim 25, wherein the instructions that cause the computer to determine at the first station whether the second station is equipped to run in the second codec mode comprise instructions that cause the computer to use in-band signaling.

27. The computer-readable medium of claim 25, wherein the instructions that cause the computer to determine at the first station whether the second station is equipped to run in the second codec mode comprise instructions that cause the computer to transmit in-band probe signals to the second station and receive in-band acknowledgement signals from the second station.

28. The computer-readable medium of claim 27, further comprising instructions that cause the computer to transmit the in-band probe signals periodically for a limited amount of time.

29. The computer-readable medium of claim 27, wherein the first station is capable of generating, detecting, and reacting to in-band signals that are designed such that (a) the in-band probe signals are not received as any of the valid packets by a station that is unequipped to run in the second codec mode and (b) if the in-band acknowledgement signals are received by the first station, the first station determines that the transmission path is transcoding free and the second station is equipped to run in the second codec mode.

30. The computer-readable medium of claim 25, wherein the instructions that cause the computer to instruct the second station to run in the second codec mode comprise instructions that cause the computer to send instructions to the second station using in-band signaling.

31. The computer-readable medium of claim 25, further comprising instructions that cause the computer to set the codec at the first station to the first codec mode upon detection of a network transition from transcoder-free operation (TrFO) to non-TrFO during the call, while the first station is running the second codec mode.

32. The computer-readable medium of claim 25, wherein the first station is mobile station.

33. The computer-readable medium of claim 25, wherein the first station is a terminating station for the call.

34. The computer-readable medium of claim 25, wherein the first station is an originating station for the call.

35. The computer-readable medium of claim 25, wherein the first codec mode is a narrowband mode and the second codec mode is a wideband mode.

36. The computer-readable medium of claim 25, wherein the first station is a non-mobile station.

37. An apparatus for setting a codec for use by a first station in communication with a second station, comprising:
at least one processor that:
determines at the first station that the second station is equipped to run in a second codec mode, while on a call that is setup with the second station in a first codec mode and an infrastructure running in the first codec mode, wherein the second codec mode has compatible packet sizes with the first codec mode without a change to the infrastructure, and
responsive to determining at the first station that the second station is equipped to run in the second codec mode, sends instructions to the second station to run in the second codec mode, and sets the first station to run in the second codec mode, wherein instructing the second station to run in the second codec mode is not visible to the infrastructure, and wherein setting the first station to run in the second codec mode is not visible to the infrastructure; and
a memory coupled to the at least one processor that stores a codec set comprising a first codec associated with the first codec mode and a second codec associated with the second codec mode.

38. The apparatus of claim 37, wherein determining at the first station whether the second station is equipped to run in the second codec mode comprises using in-band signaling.

39. The apparatus of claim 37, further comprising an in-band signal transmitter to transmit in-band probe signals to the second station, and an in-band signal receiver to receive in-band acknowledgement signals from the second station, for use in determining at the first station whether the second station is equipped to run in the second codec mode comprises and receiving in.

40. The apparatus of claim 39, wherein the in-band signal transmitter transmits the in-band probe signals periodically for a limited amount of time.

41. The apparatus of claim 39, wherein the first station is capable of generating, detecting, and reacting to in-band signals that are designed such that (a) the in-band probe signals are not received as any of the valid packets by a station that is unequipped to run in the second codec mode and (b) if the in-band acknowledgement signals are received by the first station, the first station determines that the transmission path is transcoding free and the second station is equipped to run in the second codec mode.

42. The apparatus of claim 37, wherein instructing the second station to run in the second codec mode comprises sending instructions to the second station using in-band signaling via an in-band signal transmitter.

43. The apparatus of claim 37, wherein the at least one processor sets the codec at the first station to the first codec mode upon detection of a network transition from transcoder-free operation (TrFO) to non-TrFO during the call, while the first station is running the second codec mode.

44. The apparatus of claim 37, wherein the first station is mobile station.

45. The apparatus of claim 37, wherein the first station is a terminating station for the call.

46. The apparatus of claim 37, wherein the first station is an originating station for the call.

47. The apparatus of claim 37, wherein the first codec mode is a narrowband mode and the second codec mode is a wideband mode.

48. The apparatus of claim 37, wherein the first station is a non-mobile station.

* * * * *